O. S. JEFFRIES, Sr.
SHOCK ABSORBER.
APPLICATION FILED SEPT. 9, 1919.
1,350,313.
Patented Aug. 24, 1920.
2 SHEETS—SHEET 2.
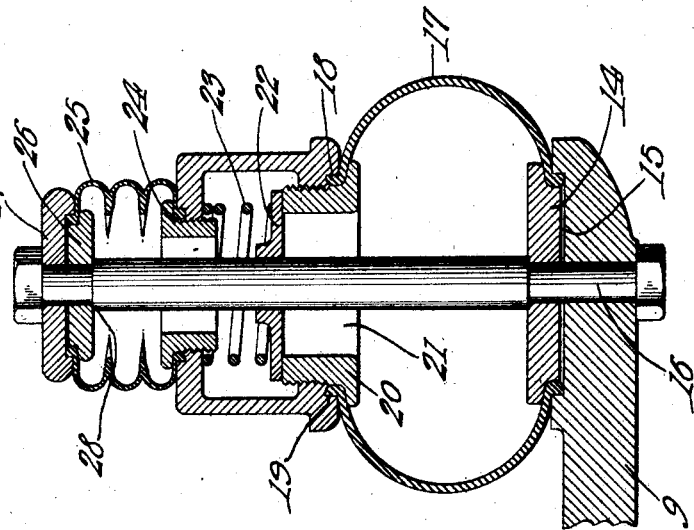
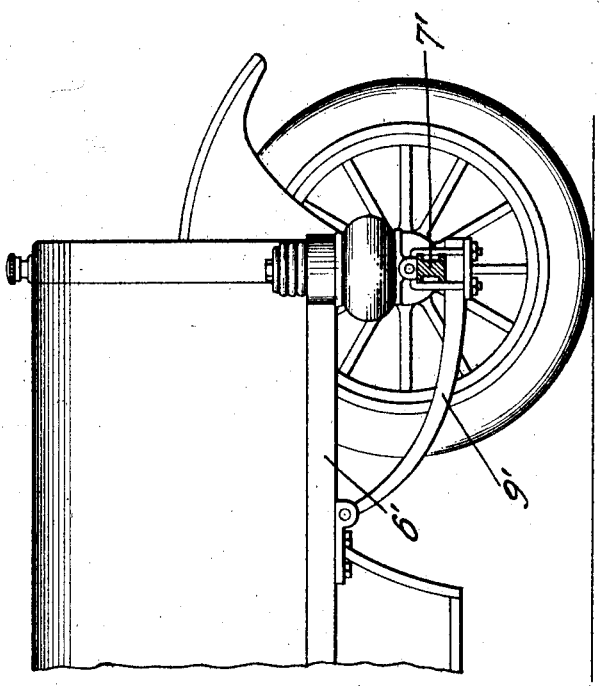
Inventor
Oscar S. Jeffries, Sr.
Witness
Ed. R. Lusby
By Norman T. Whitaker
his Attorney

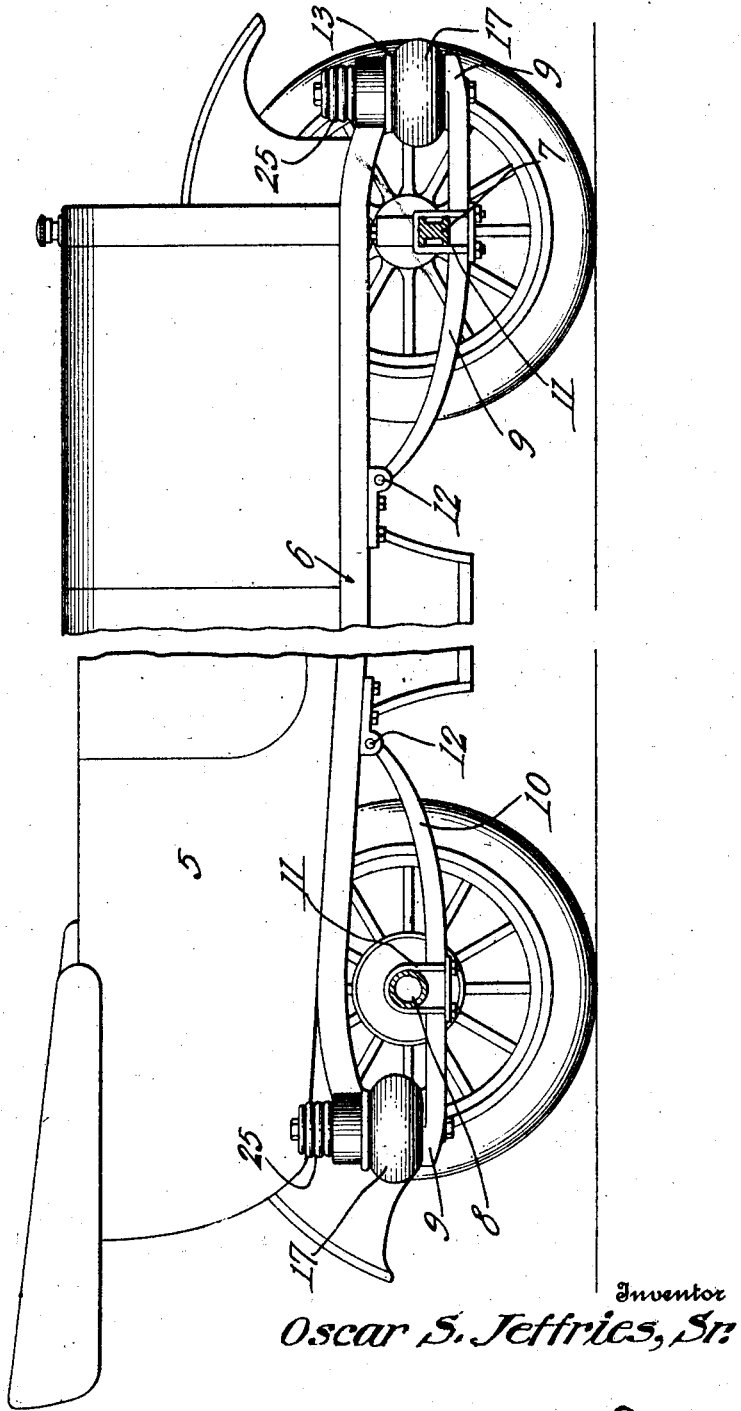

UNITED STATES PATENT OFFICE.

OSCAR S. JEFFRIES, SR., OF PHILADELPHIA, PENNSYLVANIA, ASSIGNOR OF ONE-HALF TO GEORGE W. KIRK, OF PHILADELPHIA, PENNSYLVANIA.

SHOCK-ABSORBER.

1,350,313.     Specification of Letters Patent.     Patented Aug. 24, 1920.

Application filed September 9, 1919. Serial No. 322,713.

*To all whom it may concern:*

Be it known that I, OSCAR S. JEFFRIES, Sr., a citizen of the United States, and a resident of Philadelphia, in the county of Philadelphia and State of Pennsylvania, have invented new and useful Improvements in Shock-Absorbers, of which the following is a specification.

This invention relates to shock absorbers and has particular reference to that class of shock absorbers designed to function in connection with automobiles although not restricted to such use.

An important object of the invention is to provide in a device of the above mentioned character a means whereby the major portion of a shock resulting from the contact of the automobile wheels with obstructions in the roadway may be eliminated.

A further object of the invention is to provide in a device of the above mentioned character a means whereby the conventional type of spring construction may be dispensed with, necessitating only the use of the device embodying my invention as a means for eliminating the shocks resulting from irregular road surfaces, etc.

Other objects and advantages of the invention will be apparent during the course of the following description taken in connection with the accompanying drawings.

In the drawings forming a part of this specification and wherein like numerals are employed to designate like parts throughout the same, Figure 1 is a side elevation of an automobile showing the application of the device embodying my invention, Fig. 2 is a fragmental side elevation of an automobile showing a second application of the device embodying my invention, and, Fig. 3 is a central vertical sectional view of the device embodying my invention.

In the drawings, wherein for the purpose of illustration is shown a preferred form of my invention, the numeral 5 indicates as a whole an automobile having a chassis 6 extending an appreciable distance forwardly and rearwardly respectively over the front axle 7 and the rear axle 8. To the side member of the chassis 6 there is pivotally connected a pair of oscillating arms 9 and 10 which are connected respectively to the front and rear axles 7 and 8 by means of suitable clamps as shown at 11, the oscillating arms 9 and 10 being pivotally connected to the frame as shown at 12. To the front and rear ends of the side members of the chassis 6 there is connected the device embodying my invention, the device being indicated as a whole by the numeral 13 and comprising a base plate 14 which is seated within a recess or depression as shown at 15 and held therein by means of a vertically disposed tie rod 16 passed through the end of the oscillating arms 9 and 10. Between the arm 9 and the plate 14 there is suitably secured a globular resilient cushion member 17, preferably constructed from spring steel, which, because of its resilient characteristics, tends at all times to maintain its globular shape as shown most clearly in Fig. 3, the cushion member 17 being at its upper end provided with a flange 18 dispensed within a recess 19 and suitably held therein by means of an externally screw-threaded member 20 having an enlarged opening 21 therein through which the vertically disposed rod 16 is free to reciprocate. Upon the upper face of the member 20 there is arranged a washer 22 having a spiral spring 23 disposed thereupon, the spiral spring 23 encircling the upper end of the vertically disposed rod 16 as shown in Fig. 3 and having engagement with the under face of the side member of the chassis 6. Within the ends of the side members of the chassis 6 there is disposed an externally screw-threaded clamp nut 24 which serves as a means for securing in position upon the side member of the chassis 6 an undulated compression cap 25 which in turn is secured to the vertically disposed rod 16 at its upper end by means of a plate 26 and a washer 27, the plate 26 being disposed upon a shoulder 28 provided upon the vertically disposed rod 16.

In use, the device embodying my invention may be applied to both the front and rear ends of the side members of the chassis 6, and suitably secured to the oscillating arms 9 and 10 at their front and rear ends respectively as clearly shown in Fig. 1. It is apparent that should it be desired the conventional type of leaf spring might be substituted for the oscillating arms 9 and 10 without materially altering or affecting the construction of the device embodying my invention and in use the interior of the device embodying my invention may be completely filled with a suitable liquid such as oil or the like. When any one of the wheels of the automobile is brought into contact with an obstruction in the roadway a tendency, as a result of the upward movement of the axle, is to compress the resilient cushion member 17, forcing the liquid upward through opening 21, in which instance the washer 22 which in effect serves as a valve is lifted against the influence of spring 23 allowing the oil or other suitable liquid to pass into the chamber containing the spring 23 and thence into the cushion member 25. When the axle assumes its normal position and the several coöperating elements assume as a result of the resiliency of elements 17 and 25, their respective positions shown in Fig. 3 the oil under compression above the washer or valve 22 escapes around the vertically disposed rod 16 and passes back into the cushion member 17.

In Fig. 2 I have shown somewhat of a modified application of the device embodying my invention, the device being secured as shown directly to the axle 7'. In this application it will be noted that the side members of the chassis 6' terminate directly over the axle 7' which permits the device embodying my invention to be interposed between the chassis and the axle. It will further be noted that the oscillating arm 9' terminates at the axle 7', there being no reason for its further extension as shown in Fig. 1 wherein the preferred application of the device embodying my invention is illustrative.

It is to be understood that the form of my invention herewith shown and described is to be taken as a preferred example of the same, and that various changes in the shape, size and arrangement of parts may be resorted to without departing from the spirit of the invention or the scope of the subjoined claims.

Having thus described my invention, what I claim as new and desire to secure and protect by Letters Patent of the United States, is:

1. The combination with an automobile having a chassis, an axle and an oscillating arm pivotally connected to said chassis and rigidly secured to said axle of a shock absorber comprising a globular cushion member secured to the end of said oscillating arm and said chassis, a second cushion member and a reciprocating rod connecting the first mentioned cushion member with the second mentioned cushion member.

2. The combination with an automobile having a chassis, an axle and an oscillating arm pivotally connected to said chassis and rigidly secured to said axle of a shock absorber comprising a globular cushion member secured to the end of said oscillating arm and said chassis, a second cushion member and a reciprocating rod connecting the first mentioned cushion member with the second mentioned cushion member, and means for establishing intermediate communication with the first and second named cushion members.

3. The combination with an automobile having a chassis, an axle and an oscillating arm pivotally connected to said chassis and rigidly secured to said axle of a shock absorber comprising a globular cushion member secured to the end of said oscillating arm and said chassis, a second cushion member and reciprocating rod connecting the first mentioned cushion member with the second mentioned cushion member, and a valve disposed between the first and second named cushion members for intermittently establishing and discontinuing communication between the first and second named cushion members.

4. The combination with an automobile having a chassis, an axle and an oscillating arm pivotally connected to said chassis and rigidly secured to said axle of a shock absorber comprising a globular cushion member secured to the end of said oscillating arm and said chassis, a second cushion member and reciprocating rod connecting the first mentioned cushion member with the second mentioned cushion member, a valve disposed between the first and second named cushion members for intermittently establishing and discontinuing communication between the first and second named cushion members, and spring tension means for retaining said valve normally in a closed position.

OSCAR S. JEFFRIES, Sr.